US011886132B2

(12) United States Patent
Ikegami et al.

(10) Patent No.: US 11,886,132 B2
(45) Date of Patent: Jan. 30, 2024

(54) TRANSFER BELT UNIT INCLUDING TRANSFER BELT AND BELT MEMORY CONFIGURED TO STORE THEREIN

(71) Applicant: BROTHER KOGYO KABUSHIKI KAISHA, Nagoya (JP)

(72) Inventors: Yusuke Ikegami, Nagoya (JP); Shintaro Sakaguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/533,207

(22) Filed: Nov. 23, 2021

(65) Prior Publication Data

US 2022/0163907 A1 May 26, 2022

(30) Foreign Application Priority Data

Nov. 26, 2020 (JP) ................................ 2020-195868

(51) Int. Cl.
*G03G 15/01* (2006.01)
*G03G 15/16* (2006.01)

(52) U.S. Cl.
CPC .................................. *G03G 15/161* (2013.01)

(58) Field of Classification Search
CPC .................................................. G03G 15/161
See application file for complete search history.

(56) References Cited

U.S. PATENT DOCUMENTS

| | | | | |
|---|---|---|---|---|
| 6,112,036 | A | 8/2000 | Shinohara | |
| 2007/0177894 | A1 | 8/2007 | Nakano et al. | |
| 2010/0080601 | A1 * | 4/2010 | Murayama ......... | G03G 15/0194 399/71 |
| 2021/0073605 | A1 * | 3/2021 | Fukaya ............... | H04N 1/2346 |

FOREIGN PATENT DOCUMENTS

| | | | |
|---|---|---|---|
| JP | 9-34319 | A | 2/1997 |
| JP | 11-338271 | A | 12/1999 |
| JP | 2007-10839 | A | 1/2007 |

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

A transfer belt unit for use with an image forming apparatus includes: a transfer belt; and a belt memory. The transfer belt is configured to transfer toner on a photosensitive drum of the image forming apparatus onto a sheet conveyed to a portion between the photosensitive drum and the transfer belt. The transfer belt is also configured to make contact with a cleaning roller of the image forming apparatus and to be cleaned by the cleaning roller. The belt memory includes: a first storage area configured to store therein a first rotation time period indicating a total of a period of time that the cleaning roller rotates at a first rotational speed; and a second storage area configured to store therein a second rotation time period indicating a total of a period of time that the cleaning roller rotates at a second rotational speed faster than the first rotational speed.

21 Claims, 9 Drawing Sheets

TRANSFER BELT UNIT INCLUDING TRANSFER BELT AND BELT MEMORY CONFIGURED TO STORE THEREIN

CROSS REFERENCE TO RELATED APPLICATION

This application claims priority from Japanese Patent Application No. 2020-195868 filed Nov. 26, 2020. The entire content of the priority application is incorporated herein by reference.

BACKGROUND

There has conventionally been known an image forming apparatus including a transfer belt unit. The transfer belt unit is configured to transfer toner on a photosensitive drum onto a sheet. The image forming apparatus also includes a cleaning roller for cleaning a transfer belt of the transfer belt unit.

SUMMARY

In order to calculate a deterioration quantity of the transfer belt, a period of time that the cleaning roller rotates is used, for example. In a cleaning process of the transfer belt with the cleaning roller, a rotational speed of the cleaning roller is changed depending upon a status of the transfer belt. Here, in a case where the rotational speed of the cleaning roller is not taken into account, the deterioration quantity of the transfer belt may not be calculated accurately.

In view of the foregoing, it is an object of the present disclosure to provide a transfer belt unit and an image forming apparatus in which an accurate calculation of a deterioration quantity of a transfer belt can be performed.

In order to attain the above and other objects, according to one aspect, the present disclosure provides a transfer belt unit for use with an image forming apparatus including a photosensitive drum and a cleaning roller. The cleaning roller is rotatable at one of a first rotational speed and a second rotational speed faster than the first rotational speed. The transfer belt unit includes: a transfer belt; and a belt memory. The transfer belt is configured to transfer toner on the photosensitive drum onto a sheet conveyed to a portion between the photosensitive drum and the transfer belt. The transfer belt is configured to make contact with the cleaning roller and to be cleaned by the cleaning roller. The belt memory includes: a first storage area; and a second storage area. The first storage area is configured to store therein a first rotation time period. The first rotation time period indicates a total of a period of time that the cleaning roller rotates at the first rotational speed. The second storage area is configured to store therein a second rotation time period. The second rotation time period indicates a total of a period of time that the cleaning roller rotates at the second rotational speed.

With the above configuration, the first rotation time period indicating a total period of time of the cleaning roller rotating at the first rotational speed, and the second rotation time period indicating a total period of time of the cleaning roller rotating at the second rotational speed are separately stored in the belt memory. Accordingly, a deterioration of the transfer belt can be calculated with high accuracy.

According to another aspect, the present disclosure also provides a transfer belt unit for use with an image forming apparatus including a photosensitive drum and a cleaning roller. The cleaning roller is rotatable at one of a first rotational speed and a second rotational speed faster than the first rotational speed. The transfer belt unit includes: a transfer belt; and a belt memory. The transfer belt is configured to transfer toner on the photosensitive drum onto a sheet conveyed to a portion between the photosensitive drum and the transfer belt. The transfer belt is configured to make contact with the cleaning roller and to be cleaned by the cleaning roller. The belt memory is configured to store therein a deterioration quantity of the transfer belt calculated on a basis of a first rotation time period and a second rotation time period. The first rotation time period indicates a total of a period of time that the cleaning roller rotates at the first rotational speed. The second rotation time period indicates a total of a period of time that the cleaning roller rotates at the second rotational speed With the above configuration, the deterioration quantity of the transfer belt is stored in the belt memory. The deterioration quantity is calculated on the basis of the first rotation time period of time and the second rotation time period. The first rotation time period indicates a total period of time of the cleaning roller rotating at the first rotational speed, and the second rotation time period indicates a total period of time of the cleaning roller rotating at the second rotational speed. Therefore, the deterioration quantity of the transfer belt can be accurately calculated.

According to still another aspect, the present disclosure also provides an image forming apparatus includes: a main body; a photosensitive drum; a transfer belt unit; a cleaning roller; a main memory; and a controller. The transfer belt unit includes a transfer belt configured to transfer toner on the photosensitive drum onto a sheet conveyed to a portion between the photosensitive drum and the transfer belt. The cleaning roller is configured to make contact with the transfer belt and to clean the transfer belt. The cleaning roller is rotatable at one of a first rotational speed and a second rotational speed faster than the first rotational speed. The controller is configured to perform: calculating a deterioration quantity of the transfer belt on a basis of a first rotation time period and a second rotation time period those stored in the main memory, the first rotation time period indicating a total of a period of time that the cleaning roller rotates at the first rotational speed, the second rotation time period indicating a total of a period of time that the cleaning roller rotates at the second rotational speed.

With the above configuration, the controller calculates the deterioration quantity of the transfer belt on the basis of the first rotation time period and the second rotation time period. The first rotation time period indicates a total period of time of the cleaning roller rotating at the first rotational speed, and the second rotation time period indicates a total period of time of the cleaning roller rotating at the second rotational speed. As a result, the deterioration quantity of the transfer belt is calculated with high accuracy.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Hereinafter, an image forming apparatus 1 according to a first embodiment of the present disclosure will be described with reference to FIGS. 1 to 6.

Figure 1:
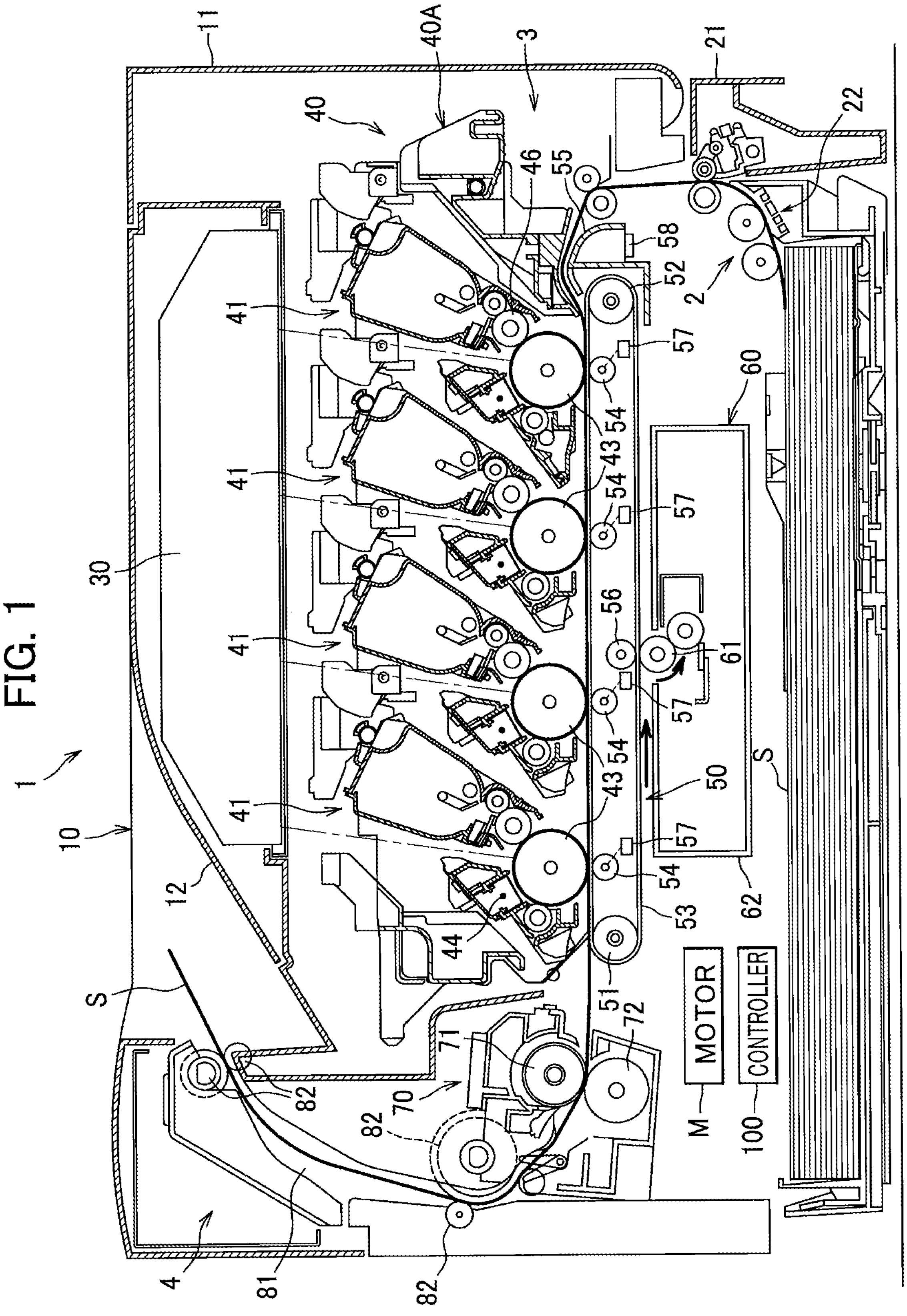
FIG. 1 is a schematic diagram illustrating a configuration of an image forming apparatus.

The image forming apparatus 1 illustrated in FIG. 1 is a color laser printer, for example. The image forming apparatus 1 includes a main casing 10, a supply unit 2, an image forming unit 3, a discharging unit 4, a controller 100, and a motor M.

The supply unit 2 is configured to supply a sheet(s) S. The supply unit 2 is disposed at a lower portion within the main casing 10. The supply unit 2 includes a supply tray 21 and a supply mechanism 22. The supply tray 21 is configured to accommodate a sheet(s) S therein. The supply mechanism 22 is configured to supply a sheet(s) S supplied from the supply tray 21 to the image forming unit 3. The sheet(s) S accommodated in the supply tray 21 are separated and supplied to the image forming unit 3 one by one by the supply mechanism 22.

The image forming unit 3 is configured to form an image on the sheet S supplied thereto. The image forming unit 3 includes an exposure unit 30, an image formation unit 40, a transfer belt unit 50, a belt cleaner 60, and a fixing unit 70.

The exposure unit 30 is positioned at an upper portion within the main casing 10. The exposure unit 30 includes a laser emitting portion, polygon mirrors, lenses, and reflection mirrors those are not illustrated.

The image formation unit 40 includes a drum cartridge 40A, and four developing cartridges 41. Each of the developing cartridges 41 is attachable to and detachable from the drum cartridge 40A. The drum cartridge 40A is attachable to and detachable from the main casing 10. Specifically, the drum cartridge 40A is movable between an attached position (a position illustrated in FIG. 1) where the drum cartridge 40A is positioned within the main casing 10 and a detached position (a position illustrated in FIG. 2) where the drum cartridge 40A is drawn out of the main casing 10. In a state where the drum cartridge 40A is attached to the main casing 10 (i.e., in the attached position), the drum cartridge 40A is positioned between the supply unit 2 and the exposure unit 30.

The drum cartridge 40A includes four photosensitive drums 43, and four chargers 44. Each of the developing cartridges 41 includes a developing roller 46, a supply roller, and a layer thickness regulating blade, and a toner accommodating portion. Note that the supply roller, the layer thickness regulating blade, and the toner accommodating portion are not accompanied by reference numerals in the drawings.

Figure 2:
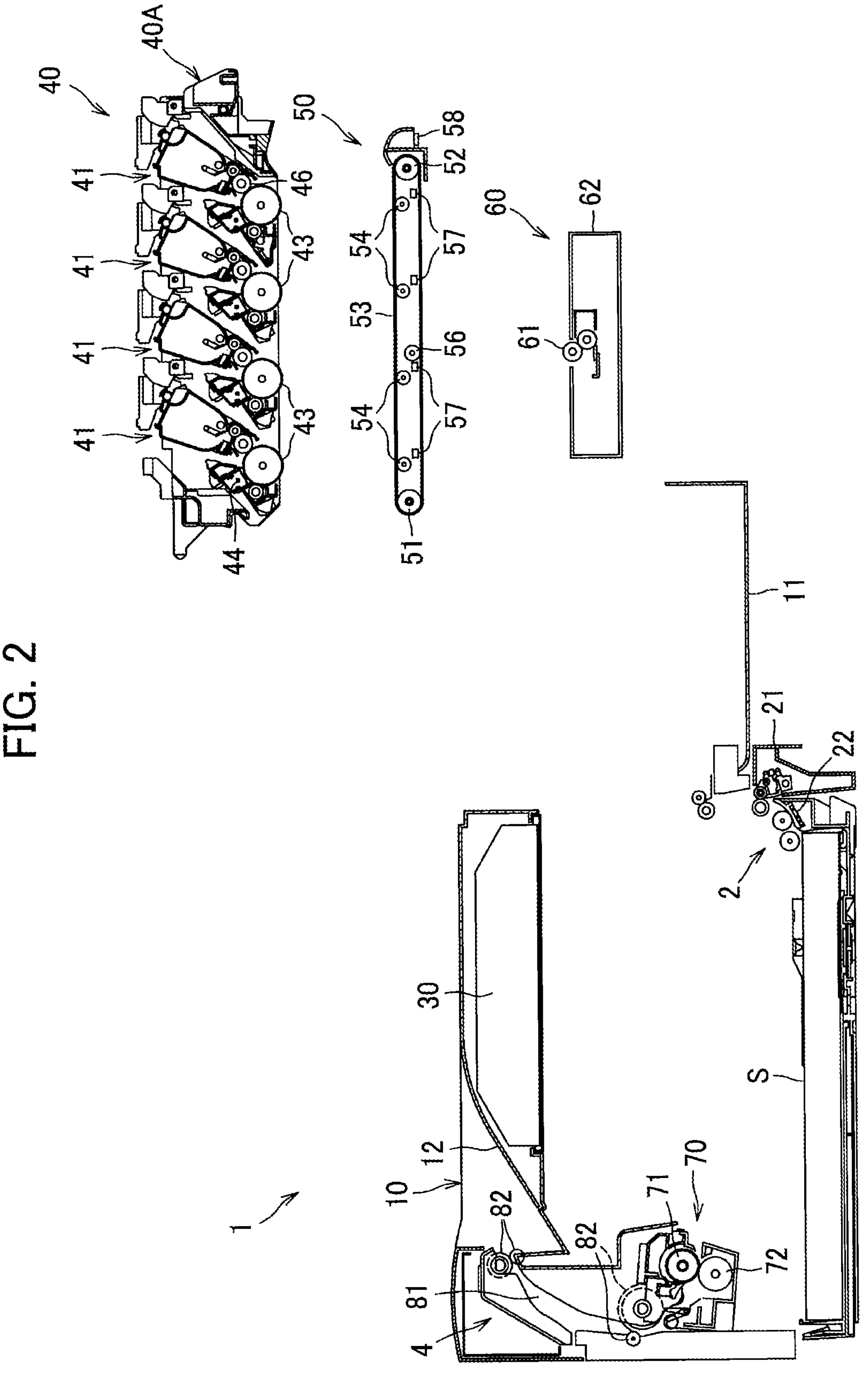
FIG. 2 is a diagram illustrating a drum cartridge, a transfer belt unit, and a belt cleaner detached from a main casing.

The transfer belt unit 50 is attachable to and detachable from the main casing 10 (see FIG. 2). In a state where the transfer belt unit 50 is attached to the main casing 10, the transfer belt unit 50 is positioned between the supply unit 2 and the image formation unit 40. The transfer belt unit 50 includes a driving roller 51, a driven roller 52, a transfer belt 53, four transfer rollers 54, a belt frame 55, a backup roller 56, four belt electrodes 57, and a belt memory 58.

The driving roller 51 is a roller configured to drive the transfer belt 53. The driving roller 51 is in contact with an inner peripheral surface of the transfer belt 53. A driving force generated by the motor M of the image forming apparatus 1 is transmitted to the driving roller 51, thereby causing the transfer belt 53 to circularly move in a direction indicated by an arrow in FIG. 1 (i.e., in a counterclockwise direction).

The driven roller 52 is a roller rotatable following circular movement of the transfer belt 53. The driven roller 52 is also in contact with the inner peripheral surface of the transfer belt 53.

The transfer belt 53 is an endless belt. The transfer belt 53 is in contact with the photosensitive drums 43 in the state where the transfer belt unit 50 is attached to the main casing 10. The transfer belt 53 is configured to transfer toners on the photosensitive drums 43 onto a sheet S conveyed to portions between the photosensitive drums 43 and the transfer belt 53. Also, the transfer belt 53 is configured to convey the sheet S conveyed to portions between the photosensitive drums 43 and the transfer belt 53 to the fixing unit 70.

Each of the transfer rollers 54 is a roller in contact with the inner peripheral surface of the transfer belt 53. Each of the transfer rollers 54 and a corresponding one of the photosensitive drums 43 is configured to nip the transfer belt 53 therebetween. The belt frame 55 rotatably supports the driving roller 51, the driven roller 52, the transfer rollers 54, and the backup roller 56. The backup roller 56 is in contact with the inner peripheral surface of the transfer belt 53.

Each of the belt electrodes 57 is electrically connected to the transfer belt 53 via a corresponding one of the transfer rollers 54. Each of the belt electrodes 57 is configured to apply a transfer bias to the corresponding one of the transfer rollers 54 so that a toner image carried on the photosensitive drum 43 is transferred onto the sheet S conveyed to a portion between the photosensitive drum 43 and the transfer belt 53.

The belt memory 58 is positioned at an outer surface of the belt frame 55. The belt memory 58 makes contact with a reading unit (not illustrated) in the state where the transfer belt unit 50 is attached to the main casing 10, thereby establishing an electrical connection with the controller 100 via the reading unit. The belt memory 58 is configured to store therein information relating to the transfer belt unit 50.

The belt cleaner 60 is attachable to and detachable from the main casing 10 (see FIG. 2). The belt cleaner 60 is positioned below the transfer belt unit 50 in a state where the belt cleaner 60 is attached to the main casing 10. The belt cleaner 60 includes a cleaning roller 61, and a collecting box 62.

The cleaning roller 61 configured to clean the transfer belt 53 by rotating while making contact with the transfer belt 53. Specifically, the cleaning roller 61 is configured to collect toner on the transfer belt 53 and causes the collected toner to be accommodated in the collecting box 62. The cleaning roller 61 is configured to nip the transfer belt 53 at a position between the cleaning roller 61 and the backup roller 56. The cleaning roller 61 is rotatable at one of a first rotational speed V1 and a second rotational speed V2 faster than the first rotational speed V1.

The fixing unit 70 is disposed at a downstream side of both the image formation unit 40 and the transfer belt unit 50 in a conveying direction of the sheet S. The fixing unit 70 includes a heat roller 71, and a pressure roller 72. The pressure roller 72 faces the heat roller 71 to press the heat roller 71.

In the image forming unit 3, a surface of each of the photosensitive drums 43 is uniformly charged by a corresponding one of the chargers 44. Thereafter, the surface of the photosensitive drum 43 is irradiated with a laser beam (indicated by one-dotted chain line in FIG. 1) emitted from the exposure unit 30. As a result, an electrostatic latent image is formed on the photosensitive drum 43. In the meantime, toner accommodated in the toner accommodating portion is supplied to the developing roller 46 through the supply roller and carried on the developing roller 46.

The toner carried on the developing roller 46 is supplied to the electrostatic latent image formed on the surface of the photosensitive drum 43. Accordingly, a toner image is formed on the photosensitive drum 43. Thereafter, the sheet S supplied onto the transfer belt 53 is conveyed to a portion between the photosensitive drum 43 and the transfer roller 54, whereby the toner image formed on the photosensitive drum 43 is transferred on the sheet S. Then, the sheet S is further conveyed to a portion between the heat roller 71 and the pressure roller 72. Consequently, the transferred toner image is thermally fixed to the sheet S.

The discharging unit 4 is configured to discharge the sheet S on which the toner images are formed. The discharging unit 4 includes a discharging path 81 and a plurality of conveying rollers 82. The discharging path 81 extends upward from an outlet of the fixing unit 70 and curves to further extend frontward. Each of the conveying rollers 82 is configured to convey the sheet S. The sheet S on which the toner image is thermally fixed passes through the discharging path 81 by the conveying rollers 82. Thereafter, the sheet S is discharged onto a discharging tray 12 formed on an upper portion of the main casing 10.

The main casing 10 includes a front cover 11 that can be opened and closed. The front cover 11 serves as a front side wall of the main casing 10. As the user opens the front cover 11, the drum cartridge 40A can be pulled out of the main casing 10. In other words, the drum cartridge 40A is attachable to and detachable from the main casing 10. Further, by detaching the drum cartridge 40A from the main casing 10, the user can take the transfer belt unit 50 out of the main casing 10.

Figure 3:
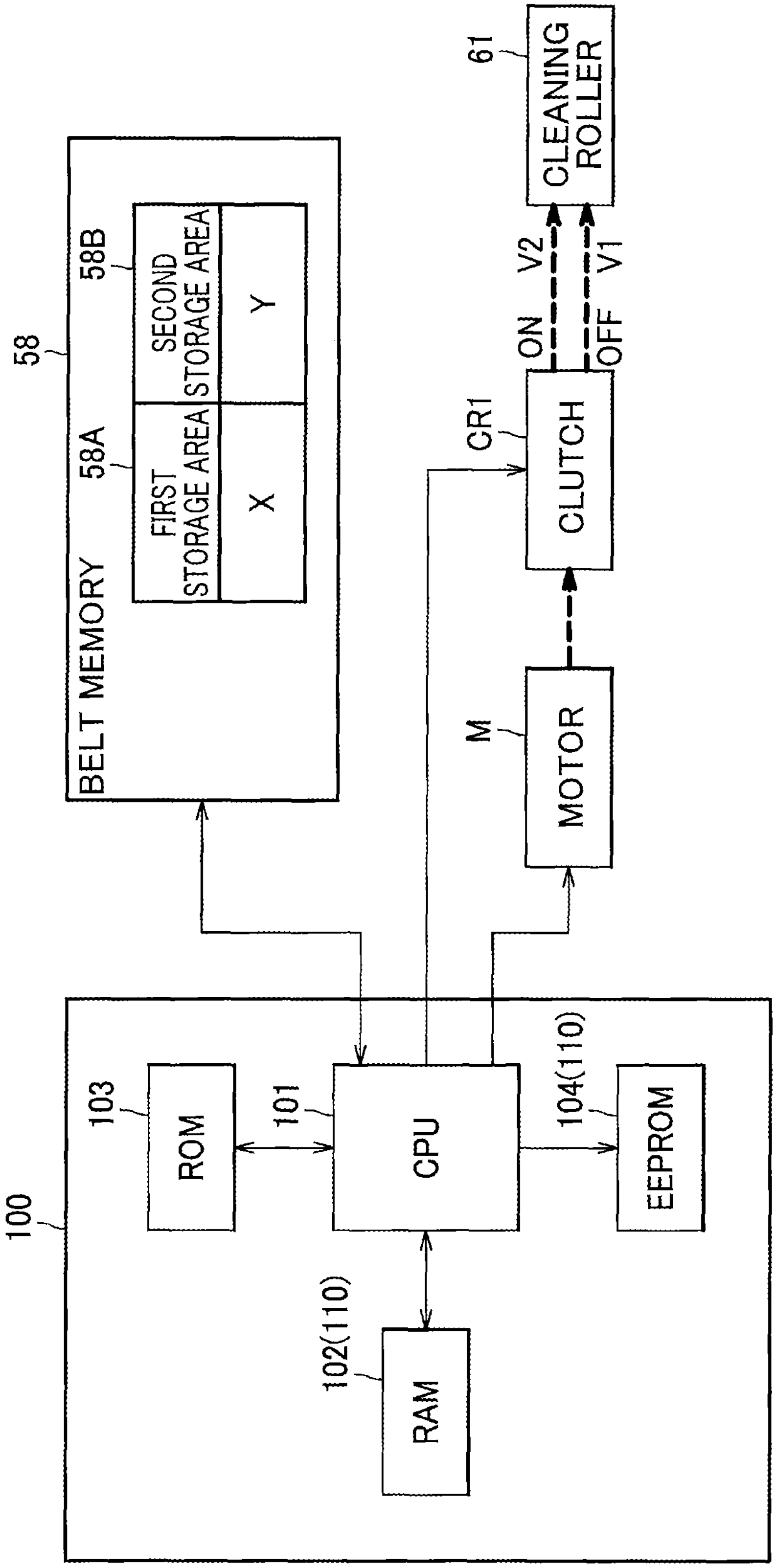
FIG. 3 is a block diagram illustrating an electrical connection among a controller, a main memory, a belt memory, a motor, and a clutch.

As illustrated in FIG. 3, the controller 100 includes a CPU 101, a RAM 102, a ROM 103, and an EEPROM 104. The controller 100 is configured to perform arithmetic processing based on information about the attached cartridges (the developing cartridges 41 and the drum cartridge 40A), programs and data those stored in the RAM 102 and the ROM 103 to execute a printing control. The information about the cartridges includes at least one of identification numbers of the cartridges or product information about the cartridges. The identification number of the cartridge is, for example, a serial number. The product information of the cartridge is, for example, information about a lifetime of the cartridge.

The RAM 102 and the EEPROM 104 are examples of a main memory 110. The RAM 102 is an example of a volatile memory. The EEPROM 104 is an example of a non-volatile memory. The CPU 101 is electrically connected to the RAM 102, the ROM 103, and the EEPROM 104. In FIG. 3, transmissions of electrical signals are shown by arrows indicated by solid lines, and transmissions of driving forces are shown by arrows indicated by dashed lines.

The controller 100 is electrically connected to the belt memory 58, the motor M, and a clutch CR1. The controller 100 can read data from and write data into the belt memory 58. The motor M and the clutch CR1 are configured to receive electrical signals from the controller 100 and to be controlled by the controller 100.

The motor M is configured to drive the photosensitive drums 43, the driving roller 51, and the cleaning roller 61 through gear trains (not illustrated). By receiving an electrical signal transmitted from the controller 100, the clutch CR1 is switchable between an ON state and an OFF state. In the present embodiment, when the clutch CR1 is in the OFF state, the cleaning roller 61 rotates at the first rotational speed V1. When the clutch CR1 is in the ON state, the cleaning roller 61 rotates at the second rotational speed V2.

Figure 4A:
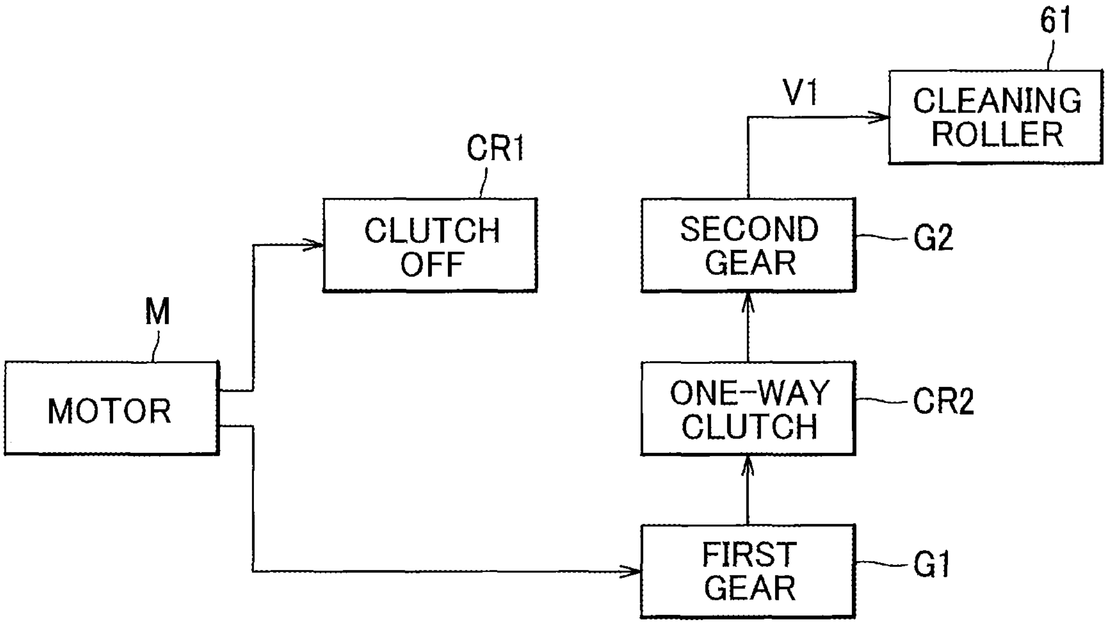
FIG. 4A is a view for explaining the transmission of the driving force of the motor to the cleaning roller in an OFF state of the clutch.
Figure 4B:
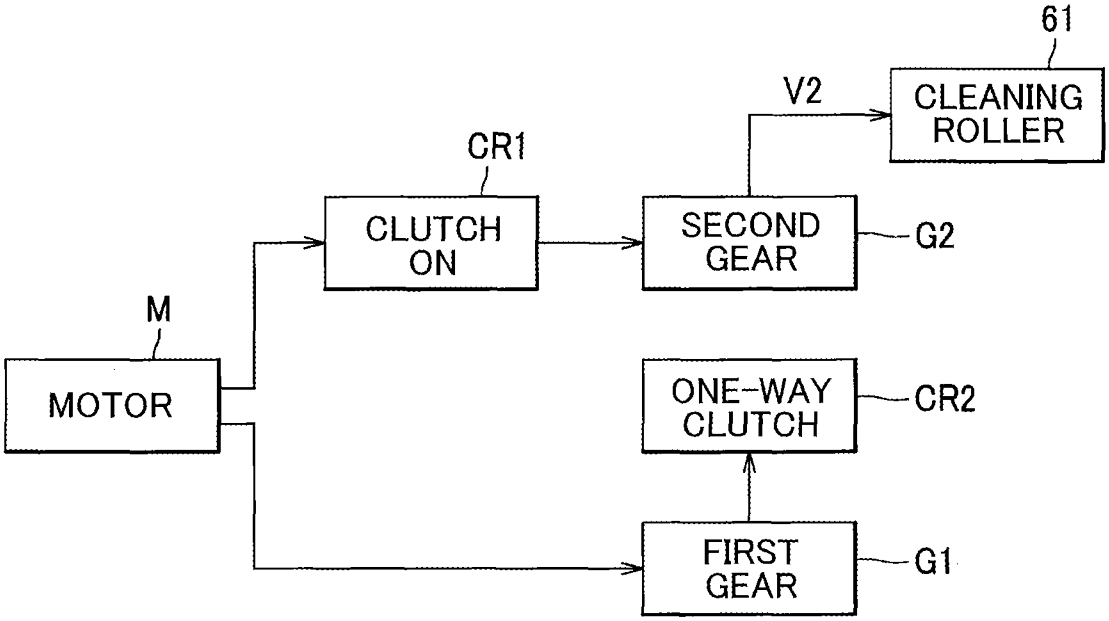
FIG. 4B is a view for explaining the transmission of the driving force of the motor to the cleaning roller in an ON state of the clutch.

More specifically, as illustrated in FIGS. 4A and 4B, the motor M is configured to drive the cleaning roller 61 through a first gear G1, a one-way clutch CR2, and a second gear G2 in addition to the clutch CR1. The clutch CR1 is connected to both the motor M and the second gear G2. The clutch CR1 in the ON state is configured to transmit a driving force of the motor M to the second gear G2. On the other hand, the clutch CR1 in the OFF state does not transmit the driving force of the motor M to the second gear G2.

The first gear G1 rotates upon receipt of the driving force from the motor M. The one-way clutch CR2 transmits a driving force from the first gear G1 to the second gear G2 but does not transmit a driving force from the second gear G2 to the first gear G1. The second gear G2 transmits a driving force to the cleaning roller 61.

When the clutch CR1 is in the OFF state, the driving force of the motor M is transmitted to the first gear G1, the one-way clutch CR2, and the second gear G2 in the stated order as illustrated in FIG. 4A, since the clutch CR1 does not transmit the driving force to the second gear G2. Accordingly, the cleaning roller 61 rotates at the first rotational speed V1.

As illustrated in FIG. 4B, when the clutch CR1 is in the ON state, the driving force of the motor M is transmitted not only to the second gear G2 via the cutch CR1 but also to the first gear G1 from the motor M. The second gear G2 rotates by the driving force received from the clutch CR1, thereby rotating the cleaning roller 61 at the second rotational speed V2 faster than the first rotational speed V1. In this case, since a rotational speed of the first gear G1 is slower than a rotational speed of the second gear G2, the one-way clutch CR2 does not transmit the driving force of the first gear G1 to the second gear G2.

The second rotational speed V2 is, for example, not less than 1.5 times and not more than 2.0 times as fast as the first rotational speed V1. When the cleaning roller 61 rotates at the second rotational speed V2, a capability of the cleaning roller 61 for cleaning the transfer belt 53 is enhanced in comparison with a case where the cleaning roller 61 rotates at the first rotational speed V1. However, when the cleaning roller 61 rotates at the second rotational speed V2, the transfer belt 53 is likely to be more worn than the case where the cleaning roller 61 rotates at the first rotational speed V1.

In regular cases, the controller 100 controls the cleaning roller 61 to rotate at the first rotational speed V1. The controller 100 controls the cleaning roller 61 to rotate at the second rotational speed V2 in a case where there is a possibility that a large amount of toner remains on the transfer belt 53.

"A case where a large amount of toner remains on the transfer belt 53" denotes, for example, a case where a test printing is performed on the transfer belt 53 for the purpose of correcting a print density, or a case where the transfer belt 53 receives toner scraped off from the photosensitive drums 43 for the purpose of cleaning the photosensitive drums 43. Further, the controller 100 may control the cleaning roller 61 to rotate at the second rotational speed V2 in a case where a printing process is performed onto a larger print area than a regular size or a printing process is performed with a print mode of greater density than a regular print mode.

Hereinafter, a calculating method of a deterioration quantity W of the transfer belt 53, a lifetime of the transfer belt 53, and a remaining lifetime of the transfer belt 53 will be described in detail.

The controller 100 counts a rotation period of time of the cleaning roller 61 from a timing at which the motor M is turned ON to a timing at which the motor M is turned off. Note that the image forming apparatus 1 further includes an oscillator and the controller 100 calculates the rotation period of time by counting clocks generated by the oscillator. In the present embodiment, the controller 100 separately counts a first rotation time period X and a second rotation time period Y. The first rotation time period X is a total of a period of time that the cleaning roller 61 rotates at the first rotational speed V1. The second rotation time period Y is a total of a period of time that the cleaning roller 61 rotates at the second rotational speed V2.

The controller 100 determines that the cleaning roller 61 rotates at the first rotational speed V1 when the clutch CR1 is in the OFF state. The controller 100 determines that the cleaning roller 61 rotates at the second rotational speed V2 when the clutch CR1 is in the ON state.

The belt memory 58 includes a first storage area 58A and a second storage area 58B. The first storage area 58A is configured to store therein the first rotation time period X, and the second storage area 58B is configured to store therein the second rotation time period Y. The RAM 102 is configured to temporarily store therein the rotation periods of time counted by the controller 100. The rotation period of time of the cleaning roller 61 rotating at the first rotational speed V1 is added to the first rotation time period X stored in the first storage area 58A. The rotation period of time of the cleaning roller 61 rotating at the second rotational speed V2 is added to the second rotation time period Y stored in the second storage area 58B.

The controller 100 calculates the deterioration quantity W of the transfer belt 53 on the basis of the first rotation time period X and the second rotation time period Y. Specifically, the controller 100 calculates the deterioration quantity W of the transfer belt 53 by adding a number obtained by multiplying the first rotation time period X by a first coefficient a to a number obtained by multiplying the second rotation time period Y by a second coefficient b ($W=aX+bY$). The second coefficient b is greater than the first coefficient a.

Note that both the first coefficient a and the second coefficient b are positive values obtained from experimental data before shipment of the image forming apparatus 1. Both the first coefficient a and the second coefficient b are stored in advance in the belt memory 58 or the main memory 110 (for example, the EEPROM 104).

The controller 100 executes a determination process and a notification process relating to a lifetime of the transfer belt 53. In the determination process, the controller 100 determines whether the deterioration quantity W of the transfer belt 53 is greater than or equal to a threshold value. Note that the threshold value used to determine the lifetime of the transfer belt 53 is stored in advance in the belt memory 58 or the main memory 110 (for example, the EEPROM 104).

In the notification process, the controller 100 notifies that the transfer belt 53 reaches an end of service life when the controller 100 determines in the determination process that the deterioration quantity W of the transfer belt 53 is greater than or equal to the threshold value. The controller 100 may notify that the transfer belt 53 reaches the end of service life by displaying messages on a display (not illustrated) or by emitting a sound.

The controller 100 calculates the remaining service life of the transfer belt 53 by subtracting the deterioration quantity W of the transfer belt 53 from a value indicating an entire service life (life span) of the transfer belt 53. The calculated remaining service life is, for example, displayed on the display (not illustrated) of the image forming apparatus 1.

Next, one example of a process for recording the rotation periods of time of the cleaning roller 61 to be performed by the controller 100 will be described with reference to a flowchart illustrated in FIG. 5. The controller 100 repeatedly executes the process of FIG. 5 as long as the image forming apparatus 1 is powered ON.

Figure 5:
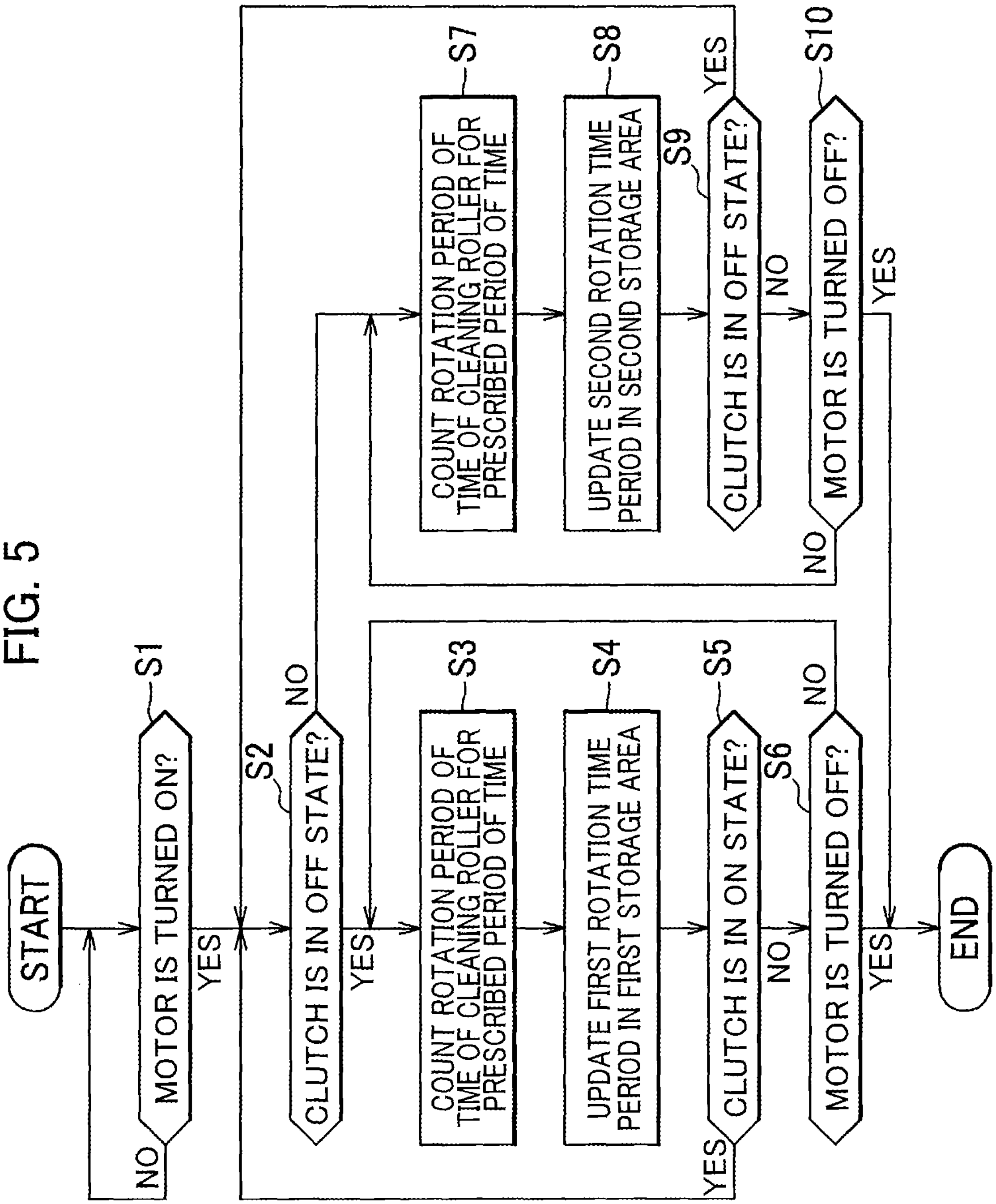
FIG. 5 is a flowchart illustrating a process executed by the controller for storing information into the belt memory.

As illustrated in FIG. 5, in S1 the controller 100 determines whether the motor M is turned ON. The controller 100 waits until the motor M is turned ON when the controller 100 determines that the motor M is not turned ON (S1: NO).

When the controller 100 determines in S1 that the motor M is turned ON (S1: YES), in S2 the controller 100 determines whether the clutch CR1 is in the OFF state.

When the controller 100 determines that the clutch CR1 is in the OFF state (S2: YES), i.e., when the cleaning roller 61 rotates at the first rotational speed V1, in S3 the controller 100 counts the rotation period of time of the cleaning roller 61 for a prescribed period of time. The counted rotation period of time of the cleaning roller 61 is sequentially written into the RAM 102. Note that the prescribed period of time may be a certain period of time, or may be a period of time for performing a print job once, or may be a period of time for rotating the photosensitive drum 43 by the prescribed number of rotations.

After the process of S3, in S4 the controller 100 updates the first rotation time period X by adding the rotation period of time counted for the prescribed period of time to the first rotation time period X stored in the first storage area 58A of the belt memory 58.

After performing the process of S4, in S5 the controller 100 determines whether the clutch CR1 is in the ON state.

When the controller 100 determines in S5 that the clutch CR1 is in the ON state (S5: YES), the routine shifts to the process of S2. On the other hand, when the controller 100 does not determine in S5 that the clutch CR1 is in the ON state (S5: NO), in S6 the controller 100 determines whether the motor M is turned OFF.

When the controller 100 does not determine in S6 that the motor M is turned OFF (S6: NO), the routine proceeds to the process in S3. On the other hand, when the controller 100 determines in S6 that the motor M is turned OFF (S6: YES), the controller 100 ends the process of FIG. 5.

When the controller 100 does not determine in S2 that the clutch CR1 is in the OFF state (S2: NO), that is, when the cleaning roller 61 rotates at the second rotational speed V2, in S7 the controller 100 counts the rotation period of time of the cleaning roller 61 for a prescribed period of time. The counted rotation period of time of the cleaning roller 61 is sequentially written into the RAM 102. Note that the prescribed period of time may be a certain period of time, or may be a period of time for performing a print job once, or may be a period of time for rotating the photosensitive drum 43 by the prescribed number of rotations.

After performing the process of S7, in S8 the controller 100 updates the second rotation time period Y by adding the rotation period of time counted for the prescribed period of time to the second rotation time period Y stored in the second storage area 58B of the belt memory 58.

After performing the process of S8, in S9 the controller 100 determines whether the clutch CR1 is in the OFF state.

The routine shifts to the process of S2 when the controller 100 determines in S9 that the clutch CR1 is in the OFF state (S9: YES). On the other hand, when the controller 100 does not determine in S9 that the clutch CR1 is in the OFF state (S9: NO), in S10 the controller 100 determines whether the motor M is turned OFF.

When the controller 100 does not determine in S10 that the motor M is turned OFF (S10: NO), the routine shifts to the process of S7. On the other hand, when the controller 100 determines in S10 that the motor M is turned OFF (S10: YES), the controller 100 ends the process of FIG. 5.

Next, description will be made as to one example of a lifetime determination process to be executed by the controller 100 according to the first embodiment with reference to a flowchart illustrated in FIG. 6. The controller 100 repeatedly executes the lifetime determination process as long as the image forming apparatus 1 is powered ON.

Figure 6:
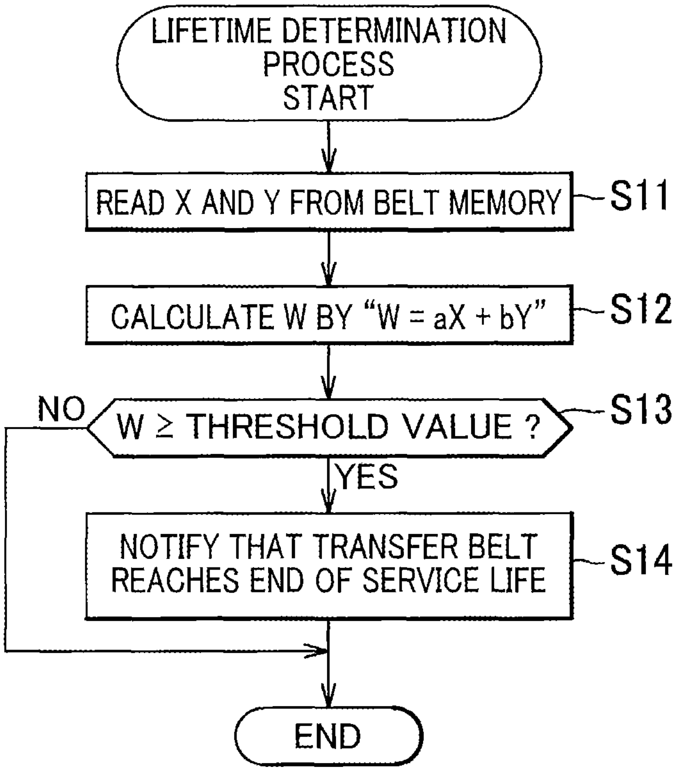
FIG. 6 is a flowchart illustrating a lifetime determination process executed by the controller.

As illustrated in FIG. 6, in the lifetime determination process, in S11 the controller 100 first reads the first rotation time period X and the second rotation time period Y from the belt memory 58 and writes the same into the RAM 102.

After the process of S11, in S12 the controller 100 calculates the deterioration quantity W of the transfer belt 53 by adding a number obtained by multiplying the first rotation time period X read from the RAM 102 by the first coefficient a to a number obtained by multiplying the second rotation time period Y read from the RAM 102 by the second coefficient b (W=aX+bY).

After the process of S12, in S13 the controller 100 determines whether the calculated deterioration quantity W is greater than or equal to a threshold value.

When the controller 100 determines in S13 that the calculated deterioration quantity W is greater than or equal to the threshold value (S13: YES), in S14 the controller 100 notifies that the transfer belt 53 reaches the end of service life and ends the process of FIG. 6. On the other hand, when the controller 100 does not determine in S13 that the calculated deterioration quantity W is greater than or equal to the threshold value (S13: NO), the controller 100 ends the process of FIG. 6 without notifying that the transfer belt 53 reaches the end of service life.

According to the above-described embodiment, the first rotation time period X representing the total period of time of the cleaning roller 61 rotating at the first rotational speed V1 and the second rotation time period Y representing the total rotation period of time of the cleaning roller 61 rotating at the second rotational speed V2 are separately stored in the belt memory 58. Accordingly, the deterioration quantity W of the transfer belt 53 can be calculated with high accuracy.

The controller 100 can calculate the deterioration quantity W of the transfer belt 53 by adding a number obtained by multiplying the first rotation time period X by the first coefficient a to a number obtained by multiplying the second rotation time period Y by the second coefficient b (W=aX+bY), for example. As such, the deterioration quantity W of the transfer belt 53 can be calculated with high accuracy.

Furthermore, the controller 100 executes the determination process for determining whether the deterioration quantity W of the cleaning roller 61 is greater than or equal to the threshold value and the notification process for notifying that the transfer belt 53 reaches the end of service life when the determination process indicates that the deterioration quantity W of the transfer belt 53 is greater than or equal to the threshold value. Through this operation, the controller 100 can appropriately notify that the transfer belt 53 reaches the end of service life.

Additionally, the controller 100 calculates the remaining service life of the transfer belt 53 by subtracting the deterioration quantity W from the value indicating the entire service life of the transfer belt 53. With such a calculation, the remaining service life of the transfer belt 53 can be obtained appropriately.

Figure 7:
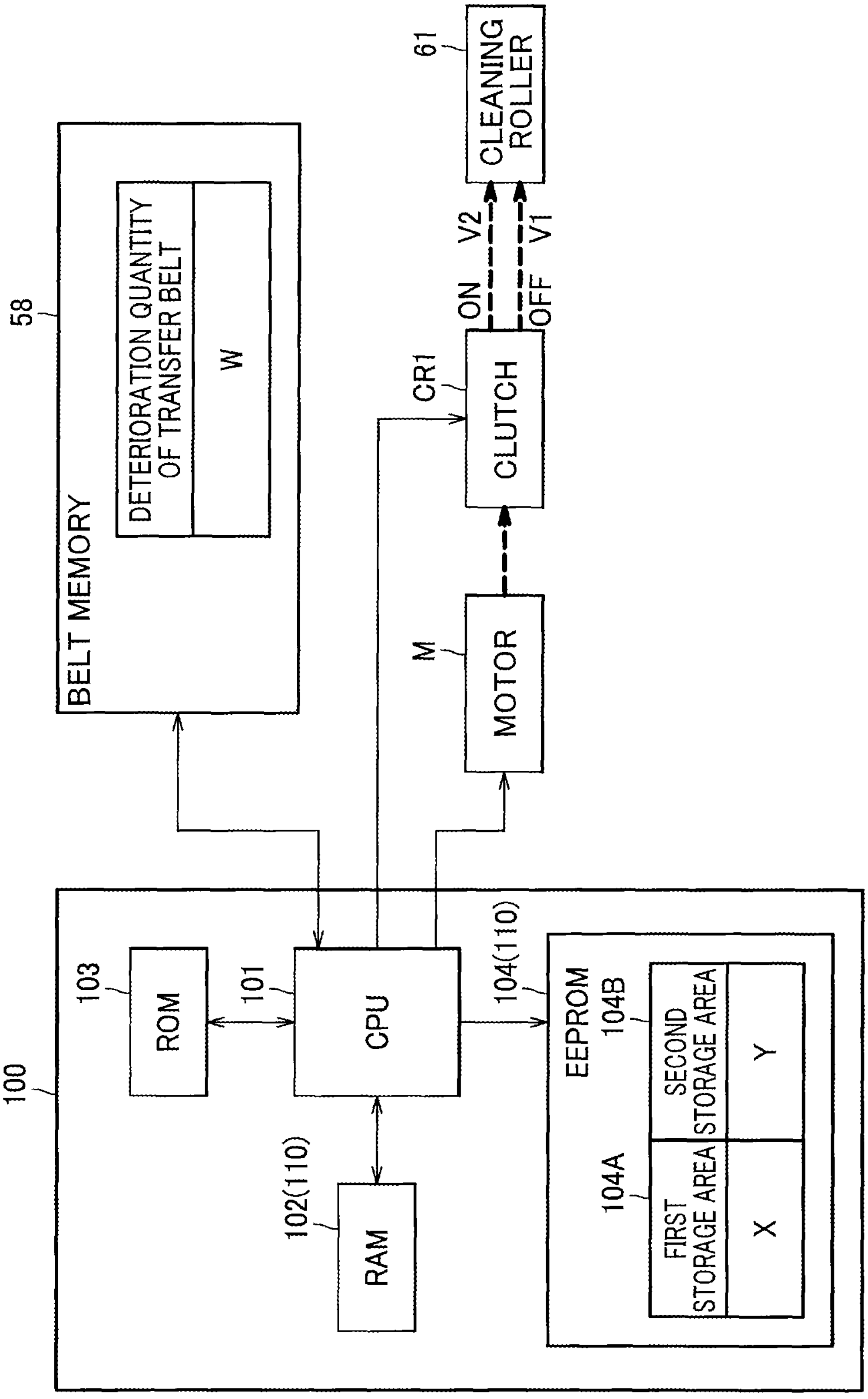
FIG. 7 is a block diagram corresponding to FIG. 3 in an image forming apparatus.

Next, an image forming apparatus according to a second embodiment of the present disclosure will be described with reference to FIGS. 7 to 9.

In the first embodiment described above, the controller 100 stores into the belt memory 58 the first rotation time period X indicating the total period of time of the cleaning roller 61 rotating at the first rotational speed V1, and the second rotation time period Y indicating the total period of time of the cleaning roller 61 rotating at the second rotational speed V2. In contrast, according to the second embodiment, the controller 100 stores into the belt memory 58 the deterioration quantity W of the transfer belt 53 as illustrated in FIG. 7.

Specifically, according to the second embodiment, the controller 100 stores the first rotation time period X into a first storage area 104A of the EEPROM 104 of the main memory 110, and stores the second rotation time period Y into a second storage area 104B of the EEPROM 104 of the main memory 110. Similar to the first embodiment, the controller 100 calculates the deterioration quantity W of the transfer belt 53 by adding a number obtained by multiplying the first rotation time period X by the first coefficient a to a number obtained by multiplying the second rotation time period Y by the second coefficient b (W=aX+bY). Then, the controller 100 stores the calculated deterioration quantity W of the transfer belt 53 into the belt memory 58.

That is, the belt memory 58 is configured to store therein the deterioration quantity W of the transfer belt 53 calculated on the basis of the first rotation time period X indicating the total period of time of the cleaning roller 61 rotating at the first rotational speed V1 and the second rotation time period Y indicating the total period of time of the cleaning roller 61 rotating at the second rotational speed V2. Note that the controller 100 may store the deterioration quantity W into the belt memory 58 each time a certain period of time elapses, or each time a print job is performed.

Next, one example of a process to be executed by the controller 100 according to the second embodiment will be described with reference to a flowchart illustrated in FIG. 8. The description will be made only to processes different from those in the flowchart of FIG. 5.

Figure 8:
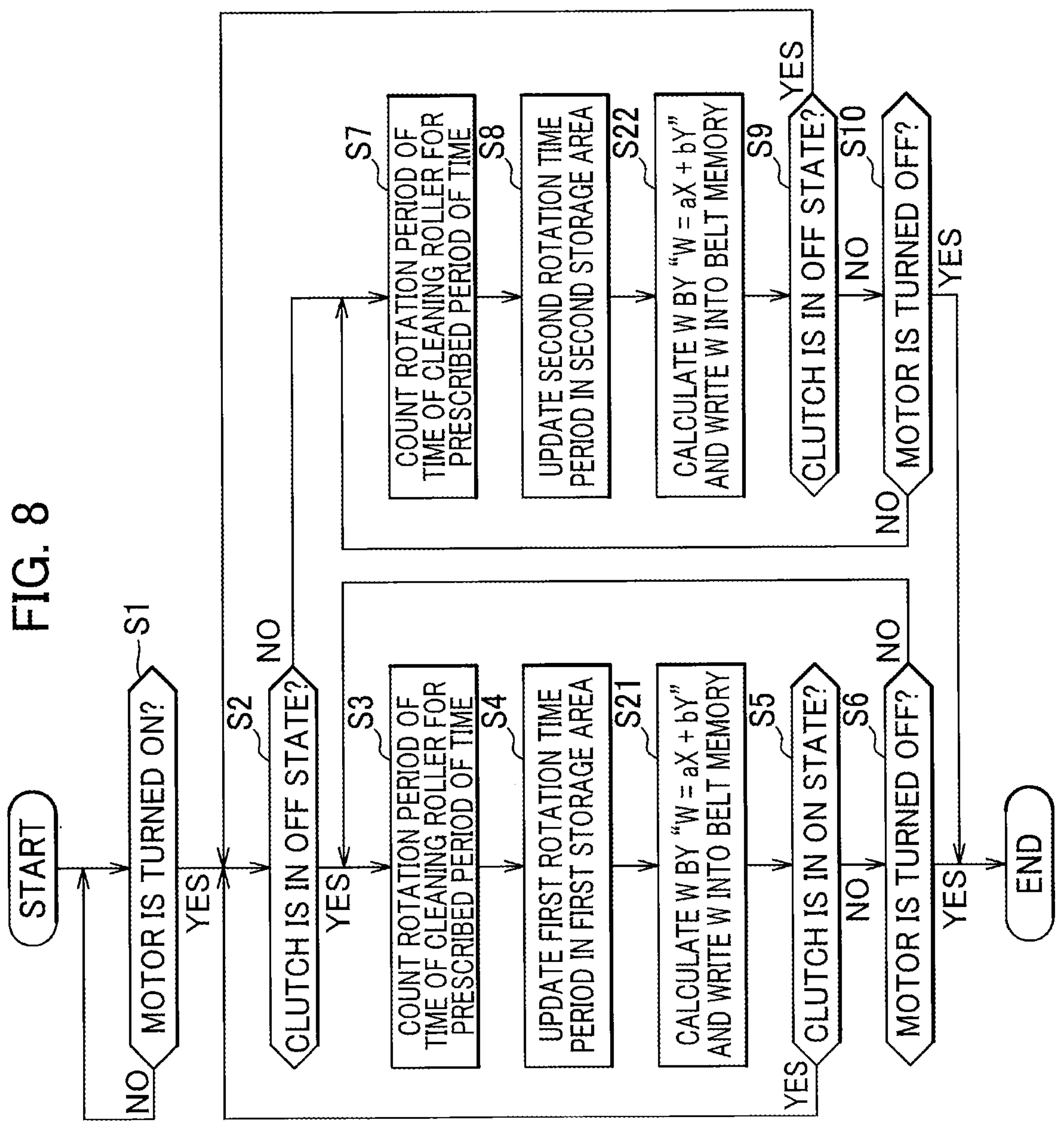
FIG. 8 is a flowchart illustrating a process executed by a controller for storing information into a belt memory.
Figure 9:
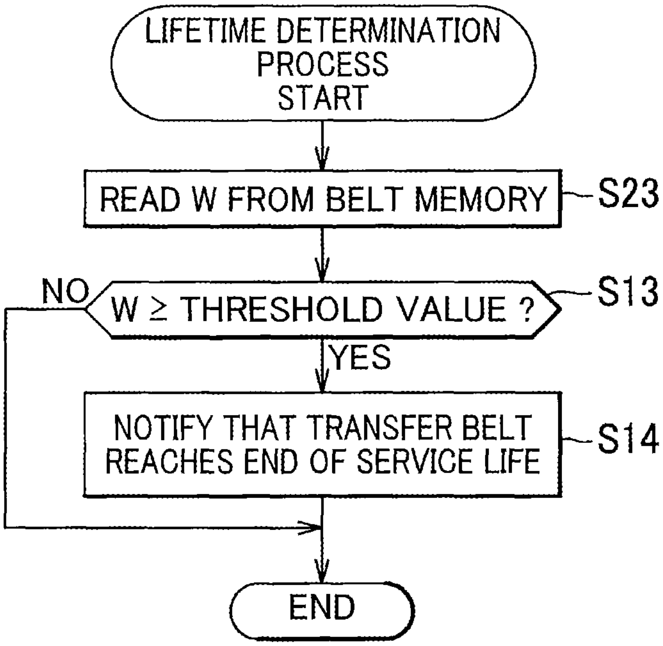
FIG. 9 is a flowchart illustrating a lifetime determination process executed by the controller.

In the second embodiment, after performing the process of S4, in S21 the controller 100 adds a number obtained by multiplying the first rotation time period X by the first coefficient a to a number obtained by multiplying the second rotation time period Y by the second coefficient b to calculate the deterioration quantity W of the transfer belt 53 (W=aX+bY), as illustrated in FIG. 8. Subsequently, the controller 100 writes the calculated deterioration quantity W into the belt memory 58. After the process of S21, the routine shifts to the process of S5.

Similarly, after the process of S8, in S22 the controller 100 adds a number obtained by multiplying the first rotation time period X by the first coefficient a to a number obtained by multiplying the second rotation time period Y by the second coefficient b to calculate the deterioration quantity W of the transfer belt 53 (W=aX+bY). Then, the controller 100 writes the calculated deterioration quantity W into the belt memory 58. Subsequent to the process of S22, the routine shifts to the process of S9.

Next, one example of a lifetime determination process to be executed by the controller 100 according to the second embodiment will be described with reference to a flowchart illustrated in FIG. 9.

In order to execute the lifetime determination process, in S23 the controller 100 reads the deterioration quantity W of the transfer belt 53 from the belt memory 58 and write the read deterioration quantity W into the RAM 102.

After the process of S23, in S13 the controller 100 determines whether the read deterioration quantity W is greater than or equal to a threshold value.

When the controller 100 determines in S13 that the deterioration quantity W is greater than or equal to the threshold value (S13: YES), in S14 the controller 100 notifies that the transfer belt 53 reaches the end of service life, and ends the lifetime determination process. On the other hand, when the controller 100 does not determine in S13 that the deterioration quantity W is greater than or equal to the threshold value (S13: NO), the controller 100 ends the lifetime determination process without notifying that the transfer belt 53 reaches the end of service life.

Similar to the first embodiment, the controller 100 according to the second embodiment described above also calculates the deterioration quantity W of the transfer belt 53 on the basis of the first rotation time period X representing the total period of time of the cleaning roller 61 rotating at the first rotational speed V1 and the second rotation time period Y representing the total period of time of the cleaning roller 61 rotating at the second rotational speed V2. Accordingly, accurate calculation of the deterioration quantity W of the transfer belt 53 can be attained.

While the description has been made in detail with reference to the above embodiments, it would be apparent to those skilled in the art that various modifications may be made thereto.

In the above-described embodiments, the photosensitive drums 43, the driving roller 51, and the cleaning roller 61 are driven by a single motor. However, these components may be driven by a plurality of motors, respectively.

Further, in the above-described embodiments, the drum cartridge is a drawer that can be pulled out of the main casing. Also, the drum cartridge includes the four photosensitive drums, and the four developing cartridges attachable to and detachable from the drum cartridge. However, other configurations may be available.

For example, the drum cartridge may not include the plurality of developing cartridges and the plurality of photosensitive drums, but may include one single developing cartridge and one single photosensitive drum.

Further, in the above-described embodiments, the drum cartridge is attachable to and detachable from the main casing in a horizontal direction. However, the drum cartridge may be attachable to and detachable from the main casing from above, or in a diagonal direction.

Further, in the above-described embodiments, the drum cartridge allows the developing cartridge including the developing roller to be attachable thereto and detachable therefrom. However, the drum cartridge may be configured to allow a toner cartridge that does not include a developing roller to be attachable thereto and detachable therefrom. In the latter case, the drum cartridge may include the developing roller and the photosensitive drum, and the toner cartridge may not include the developing roller but include a toner accommodating portion for accommodating therein toner.

Further, in the above-described embodiments, the developing cartridge is attachable to and detachable from the drum cartridge, and the drum cartridge to which the developing cartridge is attached is attachable to and detachable from the main casing. However, the developing cartridge and the drum cartridge may be attachable to and detachable from the main casing independently from each other.

Further, a drum cartridge in which a developing cartridge is integrally formed with the drum cartridge so as not to be detachable from the drum cartridge may be attachable to and detachable from the main casing. In the latter case, the drum cartridge may include a toner accommodating portion for accommodating therein toner, a developing roller, and a photosensitive drum.

Further, in the above-described embodiments, the image forming apparatus 1 is a color printer for forming a color image using toners of four colors. However, the image forming apparatus may be a monochromatic printer, or a color printer that forms a color image using toners of three colors or more than five colors.

Further, the image forming apparatus may be a multifunction peripheral or a copying machine.

Further, components and processes appearing in the embodiments and modifications described above may be suitably selected and combined as long as any conflicting combination is avoided.

What is claimed is:

1. A transfer belt unit for use with an image forming apparatus comprising a photosensitive drum and a cleaning roller, the cleaning roller being rotatable at one of a first rotational speed and a second rotational speed faster than the first rotational speed, the transfer belt unit comprising:

a transfer belt configured to transfer toner on the photosensitive drum onto a sheet conveyed to a portion between the photosensitive drum and the transfer belt, the transfer belt being configured to make contact with the cleaning roller and to be cleaned by the cleaning roller; and a belt memory including:

a first storage area configured to store therein a first rotation time period, the first rotation time period indicating a total of a period of time that the cleaning roller rotates at the first rotational speed during a cleaning operation added to a previously-stored first rotation time period stored in the first storage area; and a second storage area configured to store therein a second rotation time period, the second rotation time period indicating a total of a period of time that the cleaning roller rotates at the second rotational speed during the cleaning operation added to a previously-stored second rotation time period stored in the second storage area.

2. The transfer belt unit according to claim 1, wherein a deterioration quantity of the transfer belt is calculated on a basis of the first rotation time period and the second rotation time period, the deterioration quantity indicating a quantity by which the transfer belt is deteriorated by rotation of the cleaning roller.

3. The transfer belt unit according to claim 2, wherein the deterioration quantity is calculated by adding a first number to a second number, the first number being obtained by multiplying the first rotation time period by a first coefficient, the second number being obtained by multiplying the second rotation time period by a second coefficient, the second coefficient being greater than the first coefficient.

4. The transfer belt unit according to claim 1, wherein the second rotational speed is not less than 1.5 times and not more than 2.0 times as fast as the second rotational speed.

5. The transfer belt unit according to claim 1, wherein the transfer belt unit is for use with a fixing unit, and wherein the transfer belt is configured to convey the sheet conveyed to the portion between the photosensitive drum and the transfer belt to the fixing unit.

6. The transfer belt unit according to claim 1, wherein the transfer belt unit is attachable to and detachable from the image forming apparatus.

7. A transfer belt unit for use with an image forming apparatus comprising a photosensitive drum and a cleaning roller, the cleaning roller being rotatable at one of a first rotational speed and a second rotational speed faster than the first rotational speed, the transfer belt unit comprising:

a transfer belt configured to transfer toner on the photosensitive drum onto a sheet conveyed to a portion between the photosensitive drum and the transfer belt, the transfer belt being configured to make contact with the cleaning roller and to be cleaned by the cleaning roller; and a belt memory configured to store therein a deterioration quantity of the transfer belt calculated on a basis of a first rotation time period and a second rotation time period, the first rotation time period indicating a total of a period of time that the cleaning roller rotates at the first rotational speed during a cleaning operation added to a previously-stored period of time that the cleaning roller rotated at the first rotational speed, the second rotation time period indicating a total of a period of time that the cleaning roller rotates at the second rotational speed during the cleaning operation added to a previously-stored period of time that the cleaning roller rotated at the second rotational speed.

8. The transfer belt unit according to claim 7, wherein the deterioration quantity indicates a quantity by which the transfer belt is deteriorated by rotation of the cleaning roller.

9. The transfer belt unit according to claim 7, wherein the deterioration quantity is calculated by adding a first number to a second number, the first number being obtained by multiplying the first rotation time period by a first coefficient, the second number being obtained by multiplying the second rotation time period by a second coefficient, the second coefficient being greater than the first coefficient.

10. The transfer belt unit according to claim 7, wherein the second rotational speed is not less than 1.5 times and not more than 2.0 times as fast as the second rotational speed.

11. The transfer belt unit according to claim 7, wherein the transfer belt unit is for use with a fixing unit, and wherein the transfer belt is configured to convey the sheet conveyed to the portion between the photosensitive drum and the transfer belt to the fixing unit.

12. The transfer belt unit according to claim 7, wherein the transfer belt unit is attachable to and detachable from the image forming apparatus.

13. An image forming apparatus comprising:

a main body;

a photosensitive drum;

a transfer belt unit including a transfer belt configured to transfer toner on the photosensitive drum onto a sheet conveyed to a portion between the photosensitive drum and the transfer belt;

a cleaning roller configured to make contact with the transfer belt and to clean the transfer belt, the cleaning roller being rotatable at one of a first rotational speed and a second rotational speed faster than the first rotational speed;

a main memory; and a controller configured to perform:

calculating a deterioration quantity of the transfer belt on a basis of a first rotation time period and a second rotation time period those stored in the main memory, the first rotation time period indicating a total of a period of time that the cleaning roller rotates at the first rotational speed during a cleaning operation added to a previously-stored period of time that the cleaning roller rotated at the first rotational speed, the second rotation time period indicating a total of a period of time that the cleaning roller rotates at the second rotational speed during the cleaning operation added to a previously-stored period of time that the cleaning roller rotated at the second rotational speed.

14. The image forming apparatus according to claim 13, wherein the deterioration quantity indicates a quantity by which the transfer belt is deteriorated by rotation of the cleaning roller.

15. The image forming apparatus according to claim 13, wherein, in the calculating, the controller calculates the deterioration quantity by adding a first number to a second number, the first number being obtained by multiplying the first rotation time period by a first coefficient, the second number being obtained by multiplying the second rotation time period by a second coefficient, the second coefficient being greater than the first coefficient.

16. The image forming apparatus according to claim 13, wherein the second rotational speed is not less than 1.5 times and not more than 2.0 times as fast as the first rotational speed.

17. The image forming apparatus according to claim 13, wherein the transfer belt unit is attachable to and detachable from the main body, wherein the transfer belt unit further includes a belt memory, and wherein the controller is configured to further perform:

storing the deterioration quantity of the transfer belt into the belt memory.

18. The image forming apparatus according to claim 13, wherein the controller is configured to further perform:

determining whether the deterioration quantity of the transfer belt is greater than or equal to a threshold value; and when determining in the determining that the deterioration quantity of the transfer belt is greater than or equal to the threshold value, notifying that the transfer belt reaches an end of service life.

19. The image forming apparatus according to claim 13, wherein the controller is configured to further perform:

calculating a remaining service life of the transfer belt by subtracting the deterioration quantity of the transfer belt from a value indicating an entire service life of the transfer belt.

20. The image forming apparatus according to claim 13, further comprising a fixing unit, wherein the transfer belt is configured to convey the sheet conveyed to the portion between the photosensitive drum and the transfer belt to the fixing unit.

21. The image forming apparatus according to claim 13, wherein the transfer belt unit is attachable to and detachable from the main body.

* * * * *